United States Patent [19]

Peck, Jr.

[11] 4,062,502

[45] Dec. 13, 1977

[54] WIRE TENSION CONTROL APPARATUS ESPECIALLY FOR COIL WINDING MACHINES

[75] Inventor: Kenneth E. Peck, Jr., Springfield, Ohio

[73] Assignee: The Globe Tool and Engineering Company, Dayton, Ohio

[21] Appl. No.: 734,534

[22] Filed: Oct. 21, 1976

[51] Int. Cl.² .................... H01B 13/00; H01F 11/04
[52] U.S. Cl. .................................. 242/7.03; 242/7.11
[58] Field of Search ................ 242/7.11, 7.03, 7.13, 242/1.1 R, 82, 128; 140/92.1; 29/596, 203 R, 605

[56] References Cited

U.S. PATENT DOCUMENTS

| | | | |
|---|---|---|---|
| 3,251,559 | 5/1966 | Moore | 242/1.1 R |
| 3,346,021 | 10/1967 | Ross | 242/7.11 X |
| 3,474,983 | 10/1969 | Whitemay | 242/7.03 |
| 3,807,159 | 4/1974 | Hamel | 242/128 |

Primary Examiner—Edward J. McCarthy
Attorney, Agent, or Firm—Dybvig & Dybvig

[57] ABSTRACT

A fast acting, high response wire takeup device that takes up and releases lengths of wire in response to changes in wire demand or tension required by a coil winder or the like includes two car mounted pulleys movable along straight, parallel paths and yieldably restrained against movement toward one another. Wire is guided to one of the pulleys and away from the other pulley along paths which are at acute angles to the stretch of wire between the pulleys and the moving mass associated with the pulleys is minimal so that relatively large lengths of wire may be rapidly taken up and released as required. Modifications are also disclosed.

The wire demand or tension responsive takeup device is disclosed as part of apparatus for supplying wire to the shuttle spindle of a high speed stator winder, the apparatus further including a wire tensioning device and a powered takeup device operated synchronously with the shuttle spindle.

11 Claims, 7 Drawing Figures

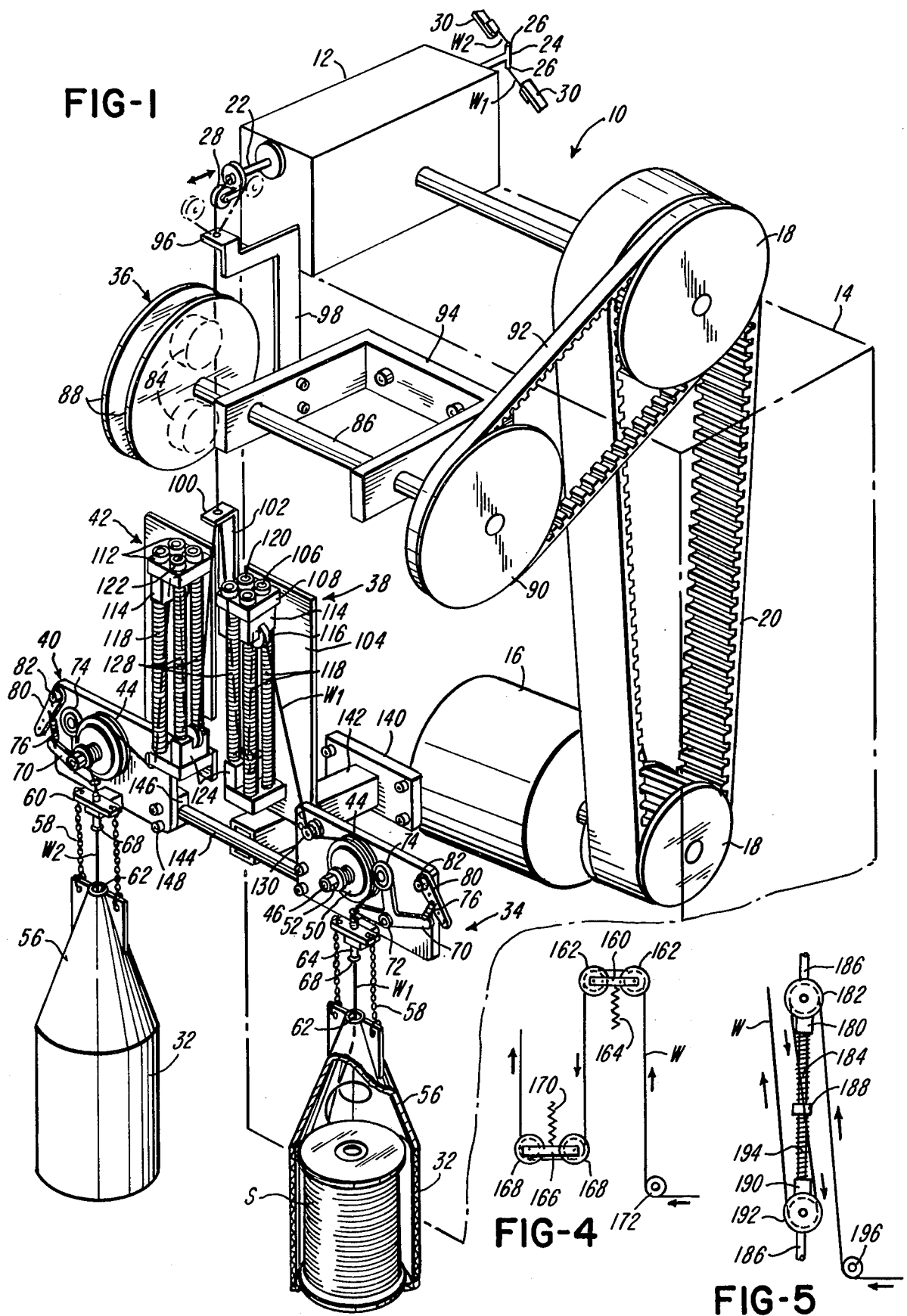

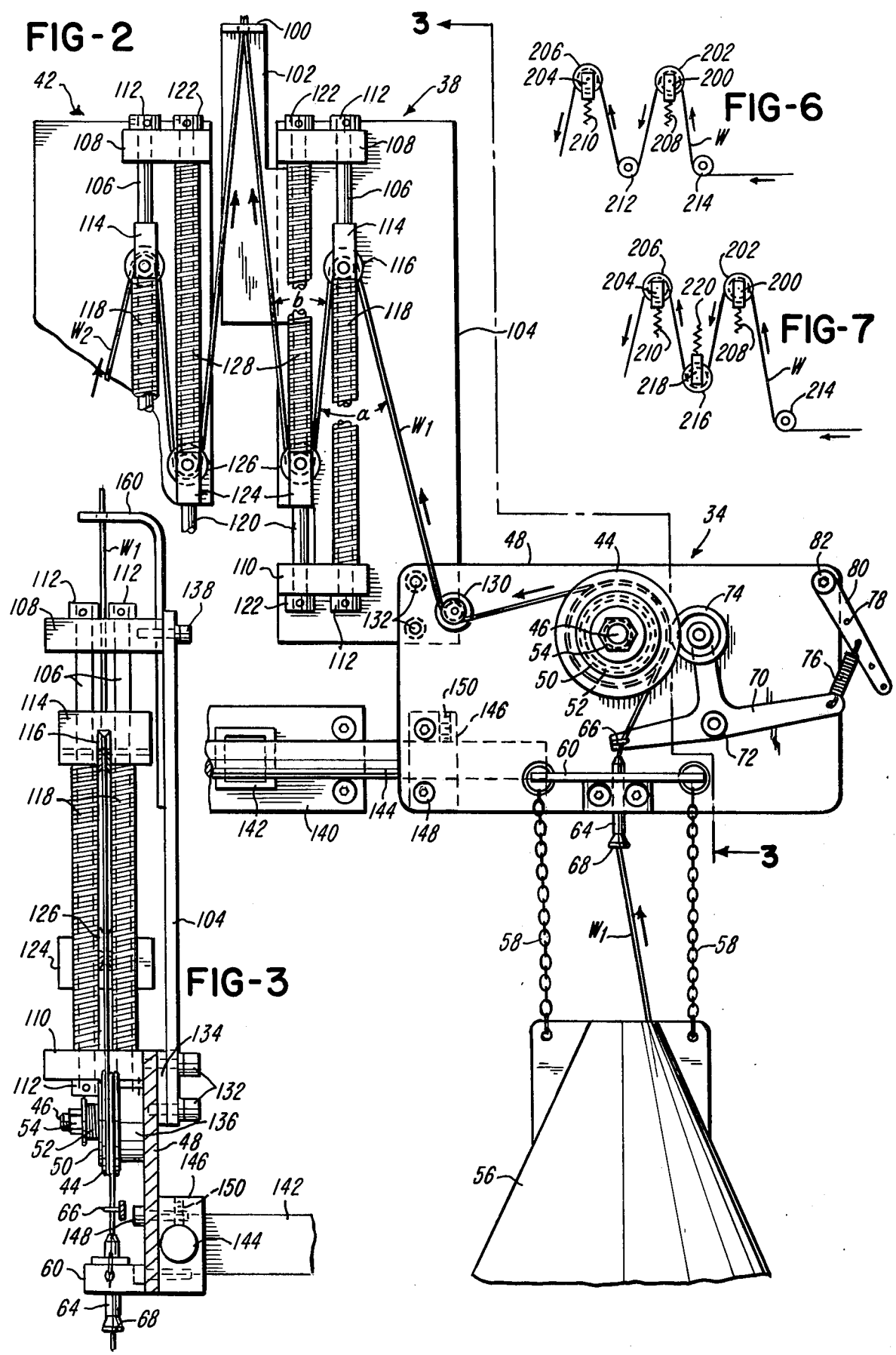

WIRE TENSION CONTROL APPARATUS ESPECIALLY FOR COIL WINDING MACHINES

BACKGROUND OF THE INVENTION

This invention relates to a wire tension control apparatus especially adapted for use in coil winding machines and, in particular, armature and stator winding machines. As will become apparent, the apparatus of this invention is capable of being used wherever variations in wire tension are encountered.

Several types of unreeling or dereeling devices have been proposed and used. In general, these devices are mounted closely adjacent to a spool of wire and are designed to exert some tension on the wire. They are also typically provided with some means for leveling out the tension depending upon the demands of the machine with which the wire is to be used. A typical prior device is shown in U.S. Pat. No. 2,643,075 granted to K. A. Moore on June 23, 1953. The device shown in the above mentioned patent is adequate for many coil winding applications including armature winding machines and stator winding machines. However, higher speed winding machines require more complete control of the tension on the wire than can be provided by the device shown in the above patent. In the case of high speed stator winding machines, it is desirable also to include a powered wire takeup device which operates in synchronism with the winding shuttle, such a takeup device being shown in U.S. Pat. No. 3,251,559 granted to H. W. Moore on May 17, 1966. In general, the wire takeup device shown in the latter patent draws wire from the dereeler when the winding head is not drawing wire and then releases the wire it draws when the winding head is drawing wire so that there is a more uniform demand for wire from the dereeler. The apparatus shown in the latter patent has been successfully used on stator winding machines having shuttle spindles which operate in the range of 800 or 900 complete strokes per minute.

More recently, stator winding machines having shuttle speeds operating in the range of 1000 to 1250 or more complete strokes per minute are being developed, and it has been discovered that a combination of a dereeling device such as shown in the above mentioned K. A. Moore U.S. Pat. No. 2,643,075 and the powered wire takeup device shown in the H. W. Moore U.S. Pat. No. 3,251,559 do not adequately control the wire tension. As a result, the wire exiting from the winding head will tend to balloon outwardly instead of closely following the guide surfaces which are provided for the wire. The wound coils have loosely formed turns and wire breakage may occur.

SUMMARY OF THE INVENTION

This invention provides for a wire tension control device usable with a wire tensioning device that provides for a greater degree of uniformity of wire tension and, accordingly, a more uniform drawing of wire from the supply than is possible using known unreeling or dereeling devices. The wire tension control device of this invention has been found to be usable with a wire takeup device such as shown in the aforementioned H. W. Moore U.S. Pat. No. 3,251,550 to avoid the ballooning and thus loose turns mentioned above in high speed stator winding machines having shuttles operating with speeds up to 1250 complete strokes per minute, and it is believed that the device will be satisfactory for use at even higher speeds. Furthermore, it has been found that the apparatus of this invention is usable without a powered wire takeup device for other coil winding applications, such as, for example, in high speed armature winding machines.

The wire tension control device of this invention includes a first car carrying a grooved wire guide pulley that is guided and confined for movement on a pair of guide rods. Wire exiting from the wire tensioning device is coursed around the pulley. Coil springs mounted on the rods yieldably resist motion of the car and the pulley in one direction along the guide rods. The path of the wire leading to the pulley from the wire tensioning device lies at an acute angle to the path of the wire exiting from the pulley. Accordingly, as the tension on the end of the wire exiting from the pulley is increased, the coil springs yield to reduce the effective length of wire between the pulley and the tensioning device. The yielded or compressed springs expand when the tension reduces so as to artificially draw wire to prevent a slack wire condition. The car, the pulleys and the coil springs are preferably made as lightweight as possible so that a minimal mass is associated therewith and the cars are capable of rapidly moving and changing direction depending on changes in the demand for or tension on the wire. The guide rods upon which the car moves are preferably straight so that the car moves along a linear path. As a result, the car is capable of maximal movement with minimal response time.

A second car mounted and confined for sliding movement on a second pair of guide rods is provided, with coil springs encircling the guide rods that yieldably resist movement of the second car in a direction opposite to the direction in which movement of the first car is resisted. The second car carries a grooved guide pulley and the assembly of the second car, pulley, guide rods and springs may be essentially identical to those described above. Wire exiting from the pulley carried by the first car is coursed around the pulley carried by the second car and then guided away from the tension control device either to the powered wire takeup device or directly to the shuttle spindle or other winding device. The first pair of guide rods are mounted adjacent and parallel to the second pair of guide rods, and the coil springs are so constructed and mounted that the pulley carried by the second car is spaced in the direction in which movement of the first car is resisted so that, given ordinary operation of the winding machine, the two cars invariably remain spaced although the spacing between them changes in response to changes in wire demand or tension. Accordingly, the acute angle relationship between the stretch of wire extending from the wire tensioning device to the pulley carried by the first car and the stretch of wire exiting from that pulley will be maintained at all times. The stretch of wire exiting from the pulley carried by the second car also lies at an acute angle to the stretch of wire between the two car mounted pulleys so that the pulley carried by the second car and the coil springs which bias it perform the same function as the first mentioned pulley and its associated springs. When using both pulleys, the linear movement which each must undergo to level out the tension or wire demand is essentially one-half the movement only one of them used alone would have to undergo. Accordingly, response time is enhanced and the length of wire takeup possible is effectively doubled.

As will be discussed below, numerous modifications are possible. In general it is an object of this invention to provide an improved, simple and reliable tension control device having wire guide means involving minimal mass, maximal takeup characteristics, and minimal response time characteristics. Further it is an object of this invention to provide an improved coil winding machine particularly usable for winding stator coils having both a powered wire takeup device and an improved wire takeup device responsive to changes in wire demand or tension.

BRIEF DESCRIPTION OF THE DRAWINGS

FIG. 1 is a partially diagrammatic and fragmentary perspective view of a high speed stator winder utilizing the apparatus of the present invention. Parts of FIG. 1 are shown in different scale from other parts in order to more clearly show the apparatus of this invention.

FIG. 2 is a fragmentary elevational view of wire tensioning and wire takeup devices forming part of the apparatus of FIG. 1.

FIG. 3 is a partial section view taken along section line 3—3 of FIG. 2.

FIGS. 4 to 7 are diagrammatic illustrations of modified wire demand or tension responsive takeup devices incorporating the principles of this invention.

DESCRIPTION OF THE PREFERRED EMBODIMENT

A stator winding machine generally designated 10 is illustrated in FIG. 1. The machine 10 may include a winding head 12 mounted on a motor housing and bed 14. The winding head 12 includes apparatus (not shown) driven by a motor 16, pulleys 18 and a belt 20 for reciprocating and oscillating a shuttle spindle 22 upon which is mounted a shuttle head 24 that projects out of one end of the winding head 12. The illustrated shuttle head 24 is of the type having a pair of wire guide needles 26. The shuttle spindle 22 is hollow and has a wire guide pulley 28 affixed to the end thereof projecting out of the opposite end of the winding head 12 so that wire strands $W_1$ and $W_2$ may be coursed over the pulley 28 through the shuttle spindle 22 and out of the needles 26. At the commencement of the winding of the coil, the free ends of the wire strands are clamped in any suitable manner as is diagrammatically illustrated by the clamps 30 in FIG. 1.

Those familiar with the art will recognize that the winding machine as thus far described is representative of winding machines used for the winding of coils on two-pole stators. In operation, a stator with winding forms attached is mounted in front of the shuttle head 24 and the shuttle spindle 22 is driven through a series of forward and reverse reciprocatory motions along its longitudinal axis and at each end of its reciprocatory movement is oscillated or rotated about its longitudinal axis to accomplish the winding of coils. The winding procedures are described in greater detail in, for example, the aforementioned Moore U.S. Pat. No. 3,251,559. That patent also illustrates one type of reciprocating and oscillating drive mechanism of which numerous types have been patented and marketed. Since this invention is applicable to any type of reciprocating and oscillating drive mechanisms including conventional drives, none is illustrated herein.

The wires $W_1$ and $W_2$ are supplied from a pair of spools S, only one of which is illustrated, housed in open-ended canisters 32. For proper operation of the winding machine, it is essential to place the wires under some tension after the wires leave the spools and before they enter the shuttle spindle 22 and, because of the uneven demand for wire at different intervals during the winding operations, some type of wire takeup device is normally required. In accordance with this invention, the wire $W_1$ exiting from the right side spool S is placed under tension by a tensioning device generally designated 34 and two wire takeup devices comprising a power driven, synchronized takeup device, generally designated 36, and a wire demand or tension responsive takeup device, generally designated 38, are provided. Wire $W_2$ exiting from the left side spool is placed under tension by a tensioning device, generally designated 40, which is constructed substantially identically to the tensioning device 34. The same wire $W_2$ is acted upon by the synchronized takeup device 36 as will be described below and also by a second wire demand or tension responsive takeup device 42 which is substantially identical to the wire demand or tension responsive device 38.

The wire tensioning device 34 is located over the right side spool and comprises a grooved pulley 44 mounted on an axle 46 and a frame plate 48. The pulley 44 is free to rotate on the axle 46 but its rotation may be frictionally resisted by a disc 50 bearing against a side face of the pulley 44 and pressed thereagainst by a spring 52 coiled about the axle 46. The disc 50 may be subjected to varying pressure by adjustment of a nut 54 threadedly mounted on the axle 46. As is conventional, the wire strand $W_1$ is coursed completely around the pulley 44 and it may be wrapped several times around the pulley 44. The wire $W_1$ is guided from the supply spool S to the tensioning pulley 44 by a wire cone or hood 56 which may be suspended by chains 58 from a bracket assembly 60 affixed to the frame plate 48. The purpose of the cone 56 is to confine the wire against a ballooning as it is pulled off the end of the wire spool and to provide a restricted aperture 62 at its upper end which serves as the first restriction through which the wire must pass. The wire $W_1$ then passes through a wire guide tube 64 supported by the bracket assembly 60 and radially located with respect to the axis of the pulley 44. Thence, the wire passes through an eyelet 66 and into the circumferential groove in the pulley 44. Both the eyelet 66 and the entrance tip designated 68 of the wire guide tube 64 may be made of hardened metal to resist wear resulting from the wire rubbing thereagainst. The eyelet 66 is mounted on an inverted T-shaped lever 70 that is pivotally mounted by an axle 72 to the frame plate 48. A roller 74 is rotatably mounted on a leg of the T-shaped lever 70. The roller 74 has a resilient rim positioned to ride in the groove in the pulley 44 for retaining the wire in the groove and incidentally contributing to the tension placed on the wire. The lever 70 is biased by a spring 76, one end of which is connected to the lever and the other end of which is connected to one of a series of apertures 78 in an arm 80 affixed to the frame plate 48 by a bolt 82. The bolt 82 may be loosened and the arm 80 positioned as desired to adjust the pressure exerted by the roller 74 against the pulley 44.

The powered wire takeup device 36 may be identical to the takeup device described in the aforementioned Moore patent 3,251,559 and includes a pair of pulleys or spindles 84 mounted on diametrically opposed sides of the axis of a takeup drive shaft 86 by a pair of plates 88. The makeup drive shaft 86 is driven by a pulley 90 and a belt 92 off the shuttle drive pulleys 18 and the motor 16. The takeup device 36 is mounted by a bracket 94 on the rear of the machine 10 and a wire guide plate 96 is mounted by a bracket 98 to the bracket 94. The aperture in the wire guide plate 96 is aligned with an aperture in a lower wire guide plate 100 mounted by a bracket 102 to a frame plate 104 forming part of the wire demand or tension responsive takeup device 38. The apertures in the guide plates 96 and 100 are so located that the wires $W_1$ and $W_2$ are guided along a path extending closely adjacent the axis of the takeup shaft 86 and the wire strands $W_1$ and $W_2$ will lightly engage the pulleys or spindles 84 when they are in their vertical position illustrated in FIG. 1. As described in the aforementioned Moore U.S. Pat. No. 3,251,559, rotation of the shaft 86 in synchronism with the drive of the shuttle spindle 22 creates an artificial wire demand during those time intervals in which the shuttle head 24 is not undergoing movement which draws wire. During those time intervals in which the shuttle head 24 is drawing wire, the pulleys or spindles 84 are moving to positions in which they would draw little or no wire. Accordingly, the powered wire takeup device 36 performs a function of substantially leveling out the demand for wire from the wire supply spools.

As previously mentioned, it is known to use a tensioning device with the powered wire takeup device 36 in association with another arm such as the clutch rod 84 described in the aforementioned Moore U.S. Pat. No. 3,521,559 or with a dancer arm or the like to supply wire to various winding machines, including armature and stator winding machines. For other wire winding applications, such as with slow speed stator winders or armature winding machines, a standard dereeler is sufficient and the powered wire takeup is not needed. However, if the stator winding machine 10 is to be operated at very high speeds, even the use of a tensioning device with a dancer arm or the like wire takeup and a powered wire takeup are inadequate. Because of the complex movement of the shuttle spindle 22 it is not possible for the constantly rotating powered wire takeup device 36 to fully accommodate the shuttle spindle movements to create a uniform wire demand from the wire spools. In general, as the speed of operation of the winding machine increases, the need increasingly arises to provide additional wire takeup or tension leveling or control means. For example, it is found that, in the operation of a stator winding machine having a shuttle moving at rates in the range of 1000 to 1250 complete strokes per minute, available simple and rugged takeup devices known in the industry are not adequate to prevent variations in tension which result in the winding of loose coils and possible frequent wire breakage. Accordingly, the need exists for wire takeup devices that are simple, rugged, relatively inexpensive and can respond very rapidly to changes in wire tension and further have a large effective distance through which the wire can be taken up so as to accommodate relatively large changes in wire demand or tension. The wire takeup devices 38 and 42 meet the desired criteria. Since both devices are constructed essentially identical to one another, only the device 38 is described in detail herein.

The wire takeup device 38 comprises a first pair of parallel guide rods or posts 106 connected to and spaced from the frame plate 104 by spaced upper and lower mounting blocks 108 and 110, respectively. Any suitable connection between the guide rods 106 and the mounting blocks 108 and 110 could be provided, but, for reasons discussed below, it is presently preferred to extend the guide rods 106 through aligned apertures in the mounting blocks and affix collars 112 to each end of both of the guide rods 106 as by keys, set screws or the like. A car 114, which is in the shape of a rectangular block, has a pair of parallel holes extending therethrough which receive the guide rods 106 with a clearance fit so that the car 114 is freely slidable therealong. The center of the car is notched to receive a wire guide pulley 116 mounted for rotation thereon by a stub axle and located centrally between the guide posts 106. Movement of the car 114 toward the lower mounting block 110 is yieldably restrained or restricted by a pair of compression springs 118 coiled around the guide posts 106 and located between the car 114 and the lower mounting block 110.

The car 114 is preferably made of a plastic such as nylon or Teflon so that it is lightweight and will engage the guide rods 106, which may be made of steel, with low friction. The above described connection between the guide rods 106 and the mounting blocks 108 and 110 is designed to permit very slight movements of the guide rods 106 with respect to the mounting blocks as required to permit the car 114 to move therealong with minimal restriction so that no binding can occur.

A second pair of parallel guide rods or posts 120 are connected to the mounting blocks 108 and 110 as by collars 122. A second car 124 carrying a second wire guide pulley 126 is mounted for sliding movement along the second pair of guide rods 120. The second car 124 and its pulley 126 may be identical to the car 114 and its pulley 116, but the second car is mounted on its guide rods 120 so that the pulley receiving notch in the second car faces the upper mounting block 108, whereas the corresponding notch in the first car 114 faces the lower mounting block 110. The second car 124 is freely slidable along the guide rods 120 but movement of the second car 124 toward the upper mounting block 108 is yieldably restricted by compression springs 128 coiled about the second pair of guide rods 120 and located between the second car 124 and the mounting block 108.

The second pair of guide rods 120 is parallel to the first pair of guide rods 106 and the pulley 126 is mounted centrally therebetween so that the center of the groove of both the first pulley 116 and the second pulley 126 are coplanar. Further associated with the car mounted pulleys 116 and 126 is a guide pulley 130 rotatably mounted on the frame plate 48. The wire $W_1$ exiting from the grooved tensioning pulley 44 is coursed around the guide pulley 130 and over the first car mounted pulley 116, the second car mounted pulley 126, through the aperture in the lower wire guide plate 100 and then through the aperture in the upper wire guide plate 96 past the powered wire takeup device 36. As shown most clearly in FIG. 2, the axes of rotation of each of the pulleys 44, 130, 116 and 126 are all mutually parallel and, as can best be appreciated from inspection of FIG. 3, the wire receiving grooves in all of these pulleys are coplanar. They also lie in the same plane as the center axes of the apertures in the upper and lower guide plates 96 and 100 and the center axes of the wire guide tube 64 and the eyelet 66. Accordingly, the wire $W_1$, after it enters the wire guide tube 64, stays in the same plane until it passes through the aperture in the upper wire guide plate 96. Each of the pulleys 44, 130, 116 and 126 thus changes or bends the path of the wire $W_1$ only about the various axes of rotation thereof so that there is no force applied to the wire tending to pull it sideways out of the pulley grooves.

In FIG. 1, the car 114 is shown biased by its springs 118 to the upper end of the guide rods 106 in abutment with the lower face of the upper mounting block 108, and the car 124 biased by its springs 128 into abutment with the upper face of the lower mounting block 110. This condition does not occur in the normal operation of the winding machine and could only occur if the wire $W_1$ has broken or become completely slack. Ordinarily there is some tension on the wire and the cars 114 and 124 will be spaced from the mounting blocks 108 and 110 as illustrated in FIGS. 2 and 3. An increase in tension resulting from an increasing demand for wire drawn through the aperture in the lower guide plate 100 will tend to cause the second car 124 to be pulled upwardly toward the upper mounting block 108 and, inasmuch as this motion is restricted by the coil springs 128 associated therewith, the first car 114 will be pulled downwardly toward the lower mounting block 110. Both pairs of compression springs 118 and 128 are preferably rather loosely wound so that the cars 114 and 124 are relatively free to move toward one another as the tension of the wire begins to increase. However, the springs preferably have such strength and the pairs of guide rods 106 and 120 have a sufficient length that the pulleys 116 and 126 guided thereby will always be linearly spaced from one another in the direction of their movement along the guide rods. The specific strength of the springs and length of the guide rods thus will depend upon the tension variations encountered in the operation of the machine with which the device 38 is used.

The wire guide pulley 130 is located nearly adjacent the lower mounting block 110 so that the stretch of wire extending therefrom to the first car mounted pulley 116 will always lie at an acute angle, such as that designated "a" in FIG. 2, to the stretch of wire between the first and second car mounted pulleys. Also the stretch of wire exiting from the second car mounted pulley 126 through the aperture in the lower guide plate 100 will always be at an acute angle, such as that designated "b" in FIG. 2, to the stretch of wire between the two car mounted pulleys 116 and 126 even when the springs 118 and 128 are full compressed. To this end, it is convenient to mount the lower guide plate 100 beyond, i.e. above, the upper mounting block 108. Due to the acute angle relationships, a maximal length of wire will always be engaged with both of the car mounted pulleys. Any increase in wire tension will have a maximal tendency to pull the two cars 114 and 124 toward one another, and the springs 118 and 128 will act with maximal efficiency to take up wire by pushing the cars 114 and 124 apart when there is a decrease in wire tension. As a result, the tension responsive wire takeup device 38 has an optimal efficiency in its capability of rapidly responding to variations in wire tension whereupon greater or lesser lengths of wire will be drawn by the car mounted pulleys between the tensioning device 34 and the powered wire takeup device 36. Because the cars 114 and 124 and the pulleys 116 and 126 carried thereby are lightweight and because the mass associated with the compression springs 118 and 128 is minimal, the momentum or inertia associated with the car mounted pulleys is minimal and they are, accordingly, capable of rapid changes in direction of movement as required by the demands of the winding machine. Operation of the linearly movable car mounted pulleys 116 and 126 is believed advantageous in comparison to pulleys mounted on dancer arms which conventionally pivot about an axis and accordingly suffer from a limited range of movement effective to draw or take up wire in relation to the mass thereof. Also, substantial variations in the direction of the force exerted by the wire on the dancer arm pulleys may be experienced due to changes in the angular positions of such pulleys.

The wire demand or tension responsive wire takeup device 38 of this invention has been successfully tested in a high speed stator winder in association with a powered takeup device such as the device 36 with substantially improved results. It has also been tested for use in supplying wire to a high speed armature winding machine without a powered takeup device, again with substantially improved results. Thus it may be used as the sole wire takeup device or in combination with other wire takeup devices. It is believed that a single car such as the car 114 mounted on guide posts with coil springs yieldably resisting its movement could be used to advantage in certain coil winding situations wherein rapid extremes of wire demand or tension may not be so great as that encountered in the very high speed machines. The operating characteristics of two car mounted pulleys in contrast to only one car mounted pulley are clearly superior. Although the reasons for this phenomenon are not fully understood, it is believed at least in part due to the shorter distance through which each car must move, whereby the inertia or momentum of both is reduced, rendering them capable of responding more rapidly to changes in wire demand or tension.

The tensioning device 40 and the wire demand or tension responsive wire takeup device 42 used for supplying the wire $W_2$ to the aperture in the lower guide plate 100 are constructed identically to the tensioning device 34 and the wire takeup device 38, respectively, except for an obvious reversal of location of parts. Therefore the same reference characters are used to indicate the corresponding parts thereof The frame plates 104 and 48 on the right side of the machine could be made in one piece, but it is convenient to connect these parts together, as best shown in FIGS. 2 and 3, as by bolts 132 at adjacent corners thereof and to space the frame plates as by a spacer 134 to provide for the desired coplanar position of the various parts that guide the wire as described above. For the same reason, the tensioning pulley 44 can be mounted for rotation on a spacer 136. Also as shown in FIG. 3, bolts 138 can be used to connect the upper mounting block 108 to the frame plate 104 and similar bolts (not shown) could be used for the mounting of the lower block 110 to the frame plate 104. In general, the mountings for the various parts can all be conventional.

The two frame plates 48 along with the frame plates 104 connected thereto and the mechanisms mounted thereon can all be mounted in side-by-side relation on the rear of the machine by a mounting assembly including a mounting plate 140, a square tubing member 142 supported by the plate 140 and a cross bar 144 connected to the tube 142, the ends of which are received by slotted supports 146 connected by bolts 148 to the frame plates 48. Set screws 150 threadedly received by the supports 146 may be used to lock the frame plates 48 in the desired positions.

The embodiment of the wire demand or tension responsive device represented by the devices 38 and 42 is the presently preferred embodiment because it is simple, compact, rugged and fully satisfactory in operation. However, various modifications of the preferred embodiment can readily be imagined which would be capable of operating with substantially the same benefits. Representative modifications are diagrammatically illustrated in FIGS. 4 to 7. In FIG. 4 a first, movable, upper car 160 has two pulleys 162 rotatable about spaced, horizontal and coplanar axes. The car 160 carrying the pulleys 162 is biased upwardly by springs 164 along posts (not shown) so that downward movement of the car is resisted. In FIG. 4 and the other embodiments described below, only one spring is illustrated, it being understood that the single illustrated spring represents the pair of springs that act on each car. A second, lower car 166 which may be identical to the upper car 160 is diagrammatically illustrated as including a pair of pulleys 168 biased by a spring 170 so that upward movement of the pulleys 168 is resisted. An idler or guide pulley 172 is positioned to direct wire W from a tensioning device (not shown) in a vertical upward direction to the right side upper car pulley 162. The wire then spans across the two upper pulleys 162 and exits vertically downwardly to the right side lower car pulley 168 and exits from the left side lower car pulley 168 vertically upwardly. It will be observed in the modification of FIG. 4 that the path of the stretch of wire W approaching the upper pulleys 162 is parallel to the path of the stretch of wire exiting from the same pulleys 162. The same is true of the stretches of wire approaching and exiting from the lower pulleys 168. Although the angles "a" and "b" represented in FIG. 2 were described as acute angles, in a broader sense it is preferred that the stretch of wire leading to one car will be caused to change directions by the wire guide or guides mounted on each movable car through an angle in excess of 90°, FIG. 4 representing the case wherein the change of direction is 180°.

FIG. 5 represents an embodiment wherein the wire changes direction by more than 180°. An upper car 180 having a pulley 182 is biased by compression springs 184 coiled about guide rods 186 and trapped between the car 180 and collars 188 affixed to the centers of the guide rods 186. Only one rod 186 and one collar 188 is illustrated in the diagram of FIG. 5. A lower car 190 having a pulley 192 is biased downwardly along the same guide rods 186 by compression springs 194 trapped between the collars 188 and the lower car 190. The wire W in FIG. 5 is guided by an idler or guide pulley 196 so as to approach the upper pulley 182 along a nearly vertical path, whereas the wire exiting from the upper pulley 182 is directed to the lower pulley 192 along a path which, if extended, would interesect an extension of the path of the wire between the idler pulley 196 and the upper pulley 182. The wire exits from the lower pulley 192 along a nearly vertical path so it is seen that both pulleys 182 and 192 in cooperation with the guides associated therewith have caused the wire to change directions by more than 180°.

Although in the preferred embodiment illustrated in FIGS. 1 to 3 the path of the wire from the upper car 114 to the lower car 124 is a straight line path, this stretch of wire could engage around idler pulleys or the like so that the path of wire need not necessarily be straight so long as the stretches of wire extending to the cars are bent by the wire guides or pulleys associated therewith through a substantial angle which, as already noted, is preferably greater than 90°.

FIG. 6 is a representative embodiment of devices in which the path of wire from one car to the next is not straight. This embodiment includes a first right side car 200 having a wire guide pulley 202 and a second left side car 204 having a wire guide pulley 206. The two cars are guided and confined for vertical movement on pairs of guide rods (not shown), both cars 200 and 204 being biased upwardly by compression springs 208 and 210, respectively. An idler pulley 212 is located intermediate the pulleys 202 and 206 and vertically downward therefrom so that wire W guided by another wire guide pulley 214 to the right side car mounted pulley 202 is directed downwardly from that pulley to the intermediate idler pulley 212 then upwardly to the left side car mounted pulley 206 from which it may be guided downwardly by other guide means (not shown). It is believed that the operation of the device diagrammatically shown in FIG. 6 is apparent. Again the stretch of wire extending toward each of the car mounted pulleys changes direction around the pulleys through an angle in excess of 90° so that the maximum benefit of the spring mounted wire guides or pulleys is obtained.

It is possible and may be desirable under some circumstances to have three or more movable pulley assemblies guiding the wire rather than the two pulley assemblies of the preferred embodiment. FIG. 7 is diagrammatically illustrative of a modification wherein there are three sets of movable pulleys. The arrangement of FIG. 7 is identical to that of FIG. 6 except that the intermediate pulley 212 of FIG. 6 is replaced by a movable pulley 216 mounted by a car 218 biased downwardly by a spring 220. The other parts of FIG. 7 are given the same reference characters as those applied to FIG. 6 because they may exactly correspond thereto. Again the operation of the device of FIG. 7 is believed apparent from the foregoing description. It will be noted that, using the odd number of pulleys in FIG. 7, the direction of wire exiting from the last pulley is opposite from the direction of the wire when using only two sets of pulleys, as in FIGS. 1–5. This would be true whenever an odd number of pulleys is used as opposed to an even number.

Regardless of the number of movable spring biased pulleys or wire guides employed, it is considered important that the pulley assemblies are movable independently of one another so that movable mass and thus the inertia associated with the motion of each pulley assembly is kept to a minimum and so that each pulley assembly can respond to the wire demand or tension it experiences independently of the wire demand or tension experienced by the other pulley assemblies. It will be noted in each of the embodiments of FIGS. 4 to 7 that the grooves in the various wire guide pulleys are coplanar as in the embodiment of FIGS. 1 to 3 and in each case the cars are movable along parallel paths except of course in the embodiment of FIG. 5 wherein the paths are coaxial. These features are considered desirable although not necessarily essential since it would be possible to obtain the benefits of this invention utilizing car mounted pulleys moving in other than parallel or coaxial paths and the wire could be guided around pulleys which are other than coplanar.

The preferred embodiment is illustrated in connection with a winding machine of the type having a movable wire guide which is in the form of the shuttle head 24. Of course, the tension responsive devices incorporating the present invention may be used with other types of winding machines having other types of movable wire guides and also to winding machines in which the wire guides are stationary with respect to the bed of the machine and the form or workpiece on which coils are wound is rotated.

Although the presently preferred embodiment of this invention has been described, it will be understood that, within the purview of this invention, various changes may be made within the scope of the appended claims.

Having thus described my invention, I claim:

1. For use in a coil winding machine having powered winding means that draws wire from a wire supply at an uneven rate, the apparatus comprising:
   a. powered means operating in synchronism with said winding means for taking up slack in the wire drawn from the supply and engaging the wire between said wire supply and said winding means;
   b. a wire tensioning device engaging the wire exiting from said wire supply; and
   c. a wire tension responsive takeup device comprising a movable wire guide engaging the wire between said wire tensioning device and said powered means, means for guiding and confining said wire guide for movement along a substantially linear path, and means for yieldably resisting movement of said wire in one direction along said path.

2. A wire tension responsive takeup device for accommodating changes in wire tension in a high speed coil winding machine comprising:
   a. a first wire guide engaging the wire used for winding a coil,
   b. means for mounting said first wire guide for movement in a substantially linear path,
   c. first bias means for yieldably resisting movement of said first wire guide in one direction along said path,
   d. a second wire guide engaging the wire,
   e. means for mounting said second wire guide for movement independently of said first wire guide along a second path which is parallel to and adjacent said first mentioned path,
   f. second bias means operable independently of said first bias means for yieldably resisting movement of said second wire guide along said second path in a direction opposite to said one direction,
   g. means for guiding wire from a source of wire under tension along a predetermined path to said first wire guide, which path is at an angle to the path of the wire between said first and second wire guides, and
   h. means for guiding wire from said second wire guide along another path which is at an angle to the path of the wire between said first and second wire guides.

3. The device of claim 2 wherein both of said angles are acute angles regardless of the tension of the wire engaging said wire guides.

4. A wire demand or tension responsive device for accommodating changes in wire demand or tension in a high speed coil winding machine comprising:
   a. a first pair of parallel guide rods;
   b. a first car slidably mounted and confined for movement on said guide rods;
   c. a first pair of compression springs, one for each of said guide rods coiled thereabout and yieldably resisting movement of said car in one direction along said guide rods;
   d. a first pulley mounted on said car intermediate said guide rods;
   e. a second pair of parallel guide rods which are parallel to said first pair of guide rods;
   f. a second car slidable and confined for movement on said second pair of guide rods;
   g. a second pair of compression springs, one for each of said second pair of said guide rods coiled thereabout for yieldably resisting movement of said second car in the direction opposite to said one direction;
   h. a second pulley mounted on said second car intermediate said second pair of guide rods, the axis of rotation of said second pulley being parallel to the axis of rotation of said first pulley; and
   i. means for guiding wire from a wire supply to said first pulley and for guiding wire from said second pulley so that the stretch of wire guided from said second pulley extend along paths which are at angles to the stretch of wire between said first and second pulleys.

5. The device of claim 4 wherein said angles are acute angles and wherein said springs are constructed to maintain said pulleys relatively spaced with said second pulley being spaced from said first pulley in said one direction.

6. A wire tension responsive takeup device for accommodating changes in wire tension in a high speed coil winding machine comprising:
   a. a first wire guide engaging the wire used for winding a coil,
   b. means for mounting said first wire guide for movement in a substantially linear path,
   c. first bias means for yieldably resisting movement of said first wire guide in one direction along said path,
   d. a second wire guide engaging the wire,
   e. means for mounting said second wire guide for movement independently of said first wire guide along a second path,
   f. second bias means operable independently of said first bias means for yieldably resisting movement of said second wire guide along said second path,
   g. means for guiding wire from a source of wire under tension along a predetermined path to said first wire guide, which path is at an angle to the path of the wire extending from said first guide, and
   h. means for guiding wire from said second wire guide along another path which is at an angle to the path of the wire leading to said second wire guide.

7. The device of claim 6 wherein the path of the wire is changed by more than 90° when passing around both said first wire guide and said second wire guide.

8. The device of claim 6 wherein said substantially linear path and said second path are parallel.

9. The device of claim 8 wherein said first and second wire guides both comprise pulleys having peripheral grooves and wherein said grooves are coplanar.

10. The device of claim 6 wherein said substantially linear path and said second path are coaxial.

11. The device of claim 10 wherein said first and second wire guides both comprise pulleys having peripheral grooves and wherein said grooves are coplanar.

* * * * *

UNITED STATES PATENT OFFICE
CERTIFICATE OF CORRECTION

Patent No. 4,062,502     Dated December 13, 1977

Inventor(s) Kenneth E. Peck, Jr.

It is certified that error appears in the above-identified patent and that said Letters Patent are hereby corrected as shown below:

Column 1, line 64, "3,251,550" should read -- 3,251,559 --.

Column 4, line 67, "makeup" should read -- takeup --.

Signed and Sealed this

Thirtieth Day of May 1978

[SEAL]

Attest:

RUTH C. MASON
Attesting Officer

LUTRELLE F. PARKER
Acting Commissioner of Patents and Trademarks